US010670246B2

(12) United States Patent
Farnik et al.

(10) Patent No.: US 10,670,246 B2
(45) Date of Patent: Jun. 2, 2020

(54) FOLLOW SPOT CONTROL SYSTEM

(71) Applicant: Robe Lighting s.r.o., Roznov pod Radhostem (CZ)

(72) Inventors: Martin Farnik, Roznov pod Radhostem (CZ); Pavel Jurik, Prostredni Becva (CZ); Josef Valchar, Prostredni Becva (CZ); Jindrich Vavrik, Zubri (CZ); Jiri Zatopek, Valasske Mezirici (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 15/944,487

(22) Filed: Apr. 3, 2018

(65) Prior Publication Data

US 2018/0224099 A1 Aug. 9, 2018

Related U.S. Application Data

(60) Provisional application No. 62/480,967, filed on Apr. 3, 2017.

(51) Int. Cl.
*F21V 21/15* (2006.01)
*F21S 8/00* (2006.01)
(Continued)

(52) U.S. Cl.
CPC .............. *F21V 21/15* (2013.01); *F21S 8/003* (2013.01); *F21V 14/02* (2013.01); *H05B 47/155* (2020.01); *F21W 2131/406* (2013.01)

(58) Field of Classification Search
CPC .............. H05B 37/029; H05B 33/0863; H05B 37/0245; H05B 37/02; H05B 37/0227;
(Continued)

(56) References Cited

U.S. PATENT DOCUMENTS

| | | | |
|---|---|---|---|
| 4,527,198 | A | 7/1985 | Callahan |
| 4,947,302 | A | 8/1990 | Callahan |

(Continued)

FOREIGN PATENT DOCUMENTS

| | | | |
|---|---|---|---|
| CN | 202353867 | U | 7/2012 |
| CN | 203086829 | U | 7/2013 |

(Continued)

OTHER PUBLICATIONS

Farnik, Martin, et al.; U.S. Appl. No. 15/944,498; Filing Date: Apr. 3, 2018; Title: Follow Spot Control System; 31 pages.

(Continued)

*Primary Examiner* — Wei (Victor) Y Chan

(74) *Attorney, Agent, or Firm* — Conley Rose, P.C.; Grant Rodolph; Brooks W Taylor

(57) ABSTRACT

A follow spot controller is provided that communicates with a lighting control desk and with a first automated luminaire. A physical orientation of the follow spot controller is sensed and used to replace pan and tilt control parameters received from the lighting control desk for the first luminaire. The modified control parameters are sent to the first luminaire. A three-dimensional model of a performance area and the locations and orientations of the first luminaire and additional automated luminaires relative to the performance area may be used to calculate individual pan and tilt parameters for the additional luminaires based on the first luminaire's replacement pan and tilt parameters.

16 Claims, 9 Drawing Sheets

(51) Int. Cl.
*F21V 14/02* (2006.01)
*H05B 47/155* (2020.01)
*F21W 131/406* (2006.01)

(58) Field of Classification Search
CPC .............. F21Y 2115/10; F21Y 2107/50; F21Y 2113/17; F21S 10/026; F21V 14/02; F21V 1/00; F21V 23/0435; F21V 29/74; F21V 21/15
USPC ........ 315/292, 131, 291, 297, 307, 308, 312
See application file for complete search history.

(56) References Cited

U.S. PATENT DOCUMENTS

| | | | | |
|---|---|---|---|---|
| 5,023,709 | A | 6/1991 | Kita et al. | |
| 6,079,862 | A | 6/2000 | Kawashima et al. | |
| 6,331,756 | B1 * | 12/2001 | Belliveau | H04N 9/3141 315/316 |
| 7,354,304 | B2 * | 4/2008 | Livingston | A45F 5/00 439/501 |
| 9,526,156 | B2 | 12/2016 | LaDuke et al. | |
| 9,593,830 | B2 | 3/2017 | Conti et al. | |
| 2009/0144646 | A1 | 6/2009 | Reese | |
| 2009/0146982 | A1 * | 6/2009 | Thielman | H04N 7/15 345/207 |
| 2010/0181938 | A1 * | 7/2010 | Boleko Ribas | H05B 37/0245 315/312 |
| 2011/0285854 | A1 | 11/2011 | LaDuke et al. | |
| 2012/0126722 | A1 * | 5/2012 | Archdale | H05B 37/029 315/312 |
| 2013/0128054 | A1 * | 5/2013 | Densham | H04N 5/23296 348/169 |
| 2013/0155672 | A1 * | 6/2013 | Vo | F21S 8/00 362/233 |
| 2014/0343699 | A1 * | 11/2014 | Engelen | H05B 33/0845 700/90 |
| 2015/0003084 | A1 * | 1/2015 | Eichel | F21V 21/14 362/419 |
| 2015/0016106 | A1 * | 1/2015 | Belliveau | F21V 14/02 362/233 |
| 2015/0048233 | A1 * | 2/2015 | Dumas | F16M 11/32 248/550 |
| 2015/0084514 | A1 * | 3/2015 | Anthony | H05B 33/0863 315/131 |
| 2015/0091446 | A1 | 4/2015 | Ohta et al. | |
| 2015/0345762 | A1 * | 12/2015 | Creasman | F21S 8/038 362/428 |
| 2016/0112652 | A1 * | 4/2016 | David | H04N 1/3877 348/239 |
| 2016/0178991 | A1 * | 6/2016 | Wan | G03B 15/05 348/169 |
| 2017/0009969 | A1 | 1/2017 | Conti et al. | |
| 2017/0045211 | A1 | 2/2017 | Conti et al. | |
| 2017/0068237 | A1 * | 3/2017 | Yamaguchi | G05B 19/0426 |
| 2017/0138730 | A1 * | 5/2017 | Ohtomo | G01C 3/08 |
| 2018/0051869 | A1 * | 2/2018 | Belliveau | F21V 21/15 |
| 2018/0160507 | A1 | 6/2018 | Feeney | |
| 2019/0029088 | A1 * | 1/2019 | Clout | H05B 33/0863 |

FOREIGN PATENT DOCUMENTS

| | | | |
|---|---|---|---|
| GB | 2535909 | A | 8/2016 |
| WO | 2008104927 | A2 | 9/2008 |
| WO | 2017008023 | A1 | 1/2017 |

OTHER PUBLICATIONS

Office Action dated Jun. 28, 2018; U.S. Appl. No. 15/944,498, filed Apr. 3, 2018; 6 pages.
Office Action dated Aug. 7, 2018; U.S. Appl. No. 16/004,223, filed Jun. 8, 2018; 26 pages.
Farnik, Martin, et al.; U.S. Appl. No. 16/188,475, filed Nov. 13, 2018; Title Follow Spot Control System; 50 pages.
Office Action dated Sep. 20, 2018; U.S. Appl. No. 15/944,498, filed Apr. 3, 2018; 20 pages.
Office Action dated Jan. 22, 2019; U.S. Appl. No. 15/944,498, filed Apr. 3, 2018; 23 pages.
Office Action dated Jan. 22, 2019; U.S. Appl. No. 16/004,223, filed Jun. 8, 2018; 39 pages.
Office Action dated Jan. 22, 2019; U.S. Appl. No. 16/188,475, filed Nov. 13, 2018; 31 pages.
European Examination Report; Application No. 18165531.7; dated Mar. 5, 2019; 4 pages.
Office Action dated Aug. 19, 2019; U.S. Appl. No. 16/004,223, filed Jun. 8, 2018; 40 pages.
Final Office Action dated May 2, 2019; U.S. Appl. No. 15/944,498, filed Apr. 3, 2018; 21 pages.
Advisory Action dated Jun. 27, 2019; U.S. Appl. No. 15/944,498, filed Apr. 3, 2018; 6 pages.
Final Office Action dated May 2, 2019; U.S. Appl. No. 16/004,223, filed Jun. 8, 2018; 38 pages.
Advisory Action dated Jul. 3, 2019; U.S. Appl. No. 16/004,223, filed Jun. 8, 2018; 3 pages.
Final Office Action dated May 2, 2019; U.S. Appl. No. 16/188,475, filed Nov. 13, 2018; 33 pages.
Advisory Action dated Jul. 3, 2019; U.S. Appl. No. 16/188,475, filed Nov. 13, 2018; 3 pages.
Chinese Office Action; Application No. 201810292105.7; dated Jun. 25, 2019; 16 pages.
Final Office Action dated Jan. 9, 2020; U.S. Appl. No. 16/004,223, filed Jun. 8, 2018; 41 pages.
Notice of Allowance dated Jan. 30, 2020; U.S. Appl. No. 16/004,223, filed Jun. 8, 2018; 17 pages.
Extended European search Report; Application No. 19179007.0; dated Dec. 5, 2019; 10 pages.
Chinese Office Action; Application No. 201810292105.7; dated Mar. 31, 2020; 4 pages.

* cited by examiner

FOLLOW SPOT CONTROL SYSTEM

CROSS-REFERENCE TO RELATED APPLICATIONS

This application claims priority to U.S. Provisional Application No. 62/480,967 filed Apr. 3, 2017, by Pavel Juřik, et al., entitled, "An Improved Follow Spot System", which is incorporated by reference herein as if reproduced in its entirety.

TECHNICAL FIELD

The disclosure generally relates to a method for providing a follow spot system, specifically to methods for integrating control of a follow spot with control of a lighting rig and to adding automation to such a system.

BACKGROUND

Follow spots are a well-known part of many entertainment productions and are commonly used in theatres, television studios, concerts, theme parks, night clubs and other venues. Some follow spots are manually controlled luminaires where the operator has control over the direction the luminaire is pointing, typically to illuminate a performer, and to the color, size and other optical parameters of the luminaire. A production may include many follow spots, each with its own operator, as shown in FIG. 1. In this depiction, four follow spots 60, each with attendant operator 62, are directed towards a target point 242 on a performance area 240. A performer may be situated at the target point 242 and, as that performer moves around the performance area 240, the operators 62 will move their respective follow spots 60 to keep the performer illuminated.

In such systems, the skill of the operators 62 may not be similar, e.g., some operators may be slow to follow the performer or inaccurate in their use of the follow spot. Attempting to synchronize color or intensity changes between the multiple operators may be difficult and/or inaccurate. Additionally, a lighting designer may wish to situate the follow spots in locations where it would be difficult or unsafe to place an operator. For example, above the stage or in areas where there is insufficient height or space for an operator. Even if it is possible to safely situate the operator, he may be uncomfortable and forced to remain in a cramped position for the duration of the event.

SUMMARY

In one embodiment, a follow spot controller includes a memory, a processor, and a communication interface. The communication interface includes a first communication link that communicates with a lighting control desk and a second communication link that communicates unidirectionally with an automated luminaire. The processor senses a physical orientation of the follow spot controller. The processor also receives control parameters sent to the automated luminaire from the lighting control desk, creates modified control parameters by replacing pan and tilt parameters in the received control parameters with pan and tilt parameters based on the physical orientation of the follow spot controller, and sends the modified control parameters to the automated luminaire.

In another embodiment, a follow spot control system includes a memory and a processor. The processor senses a physical orientation of the follow spot controller and sends operator pan and tilt parameters to a first automated luminaire based on the physical orientation of the follow spot controller. The processor also sends individual calculated pan and tilt parameters to other automated luminaires based on (i) the pan and tilt parameters of the first automated luminaire and (ii) a three-dimensional model of a surface of a performance area and locations and mounting orientations of the other automated luminaires relative to the performance area.

In yet another embodiment, a method of controlling a plurality of follow spots includes creating a three-dimensional model that includes one or more surfaces of a performance area; locations and mounting orientations for automated luminaires, relative to the performance area; and location and mounting orientation for a camera, relative to the performance area. The method also includes calculating a vector that represents the center of a light beam that is projected by a first automated luminaire, based on its location and mounting orientation, and calculating a target point on a surface of the performance area based on the vector. The method further includes calculating individual pan and tilt parameters for each of the other automated luminaires based on the luminaire target point, and sending the individual pan and tilt parameters to the other automated luminaires.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments of the disclosure are illustrated in the figures, like numerals being used to refer to like and corresponding parts of the various drawings.

The disclosure generally relates to a method for providing remote control of a follow spot system. A physical orientation of a follow spot controller is sensed and used to control one or more automated luminaires. A three-dimensional model may be used to translate operator control of a first automated luminaire into pan and tilt control of other automated luminaires.

In recent years, it has become common to use automated luminaires on entertainment productions. These are luminaires where the pan and tilt position of the luminaire light beam can be remotely controlled from a lighting desk by an operator. Many products also provide control over other parameters such as the focus, beam size, beam shape and beam pattern. Attempts have been made in the past to combine these two technologies such that the effect of a follow spot can be achieved by using a remotely controlled automated light. However, such attempts have often failed or been less than satisfactory because of the slow response time of the system or the difficulty an operator had in accurately aiming a luminaire at a small spot on a stage and moving the light around in a manner which appears natural and organic, rather than mechanical and robotic. Jerky robotic movement is annoying to the audience, distracts them from the performer, and reduces their enjoyment of the performance.

Figure 1:
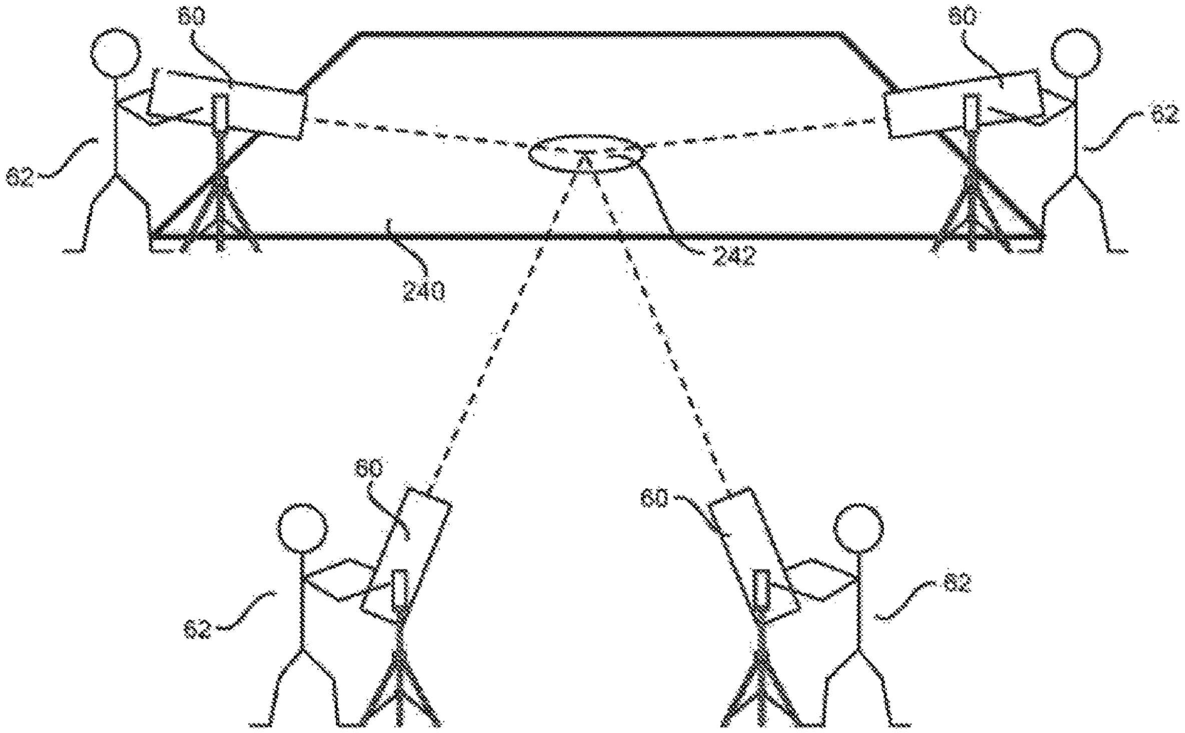
FIG. 1 illustrates a prior art follow spot system.
Figure 2:
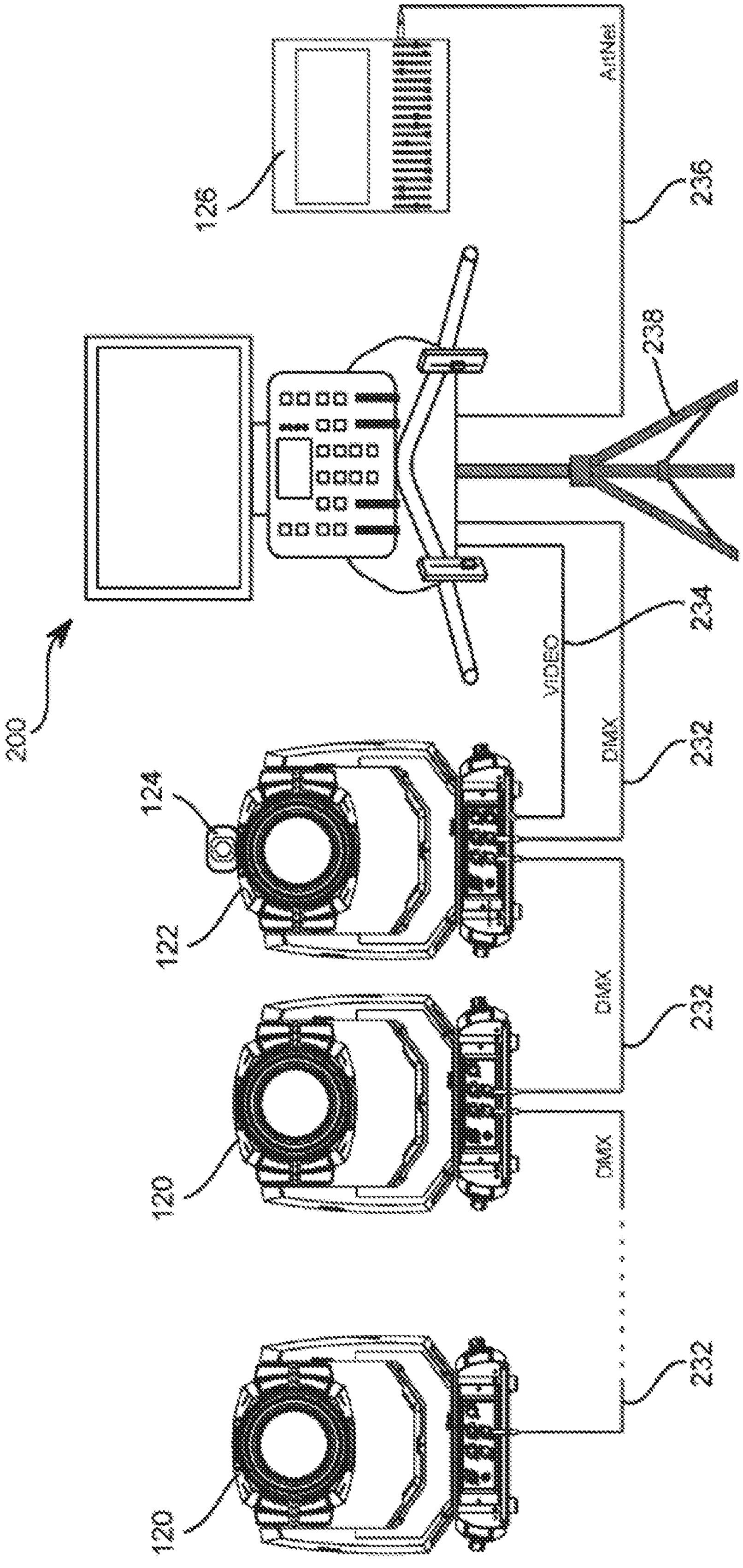
FIG. 2 illustrates the main components of an embodiment of a remotely controlled follow spot system.

FIG. 2 illustrates a first embodiment of a remotely controlled follow spot system according to the disclosure. Automated luminaires 120 and 122 are connected via a first lighting control communication link 232 to a follow spot controller 200. In turn, follow spot controller 200 is connected via a second lighting control communication link 236 to main lighting control desk 126. Each automated luminaire 120 may have its light output, pan and tilt position, color, beam size and other parameters controlled. First lighting control communication link 232 preferably uses DMX512 (Digital Multiplex) protocol, which is an industry standard, unidirectional communication protocol. However, the disclosure is not so limited and other communication protocols may be used, including Art-Net, ACN (Architecture for Control Networks), and Streaming ACN. Similarly, second lighting control communication link 236 is here shown as utilizing Art-Net, however the disclosure is not so limited and other communication interfaces or networks may be used. Both first and second lighting control communication links 232 and 236 may be wired, wireless, or optical communication links.

Follow spot controller 200 provides a bridge between first and second lighting control links 232 and 236 and may override or replace a limited set of parameters sent from lighting control desk 126 to automated luminaires 120. For example, follow spot controller 200 may override just the pan and tilt parameters for one or more of the automated luminaires 120 and 122, thereby controlling which directions the automated luminaires are pointing, while lighting control desk 126 retains control of the other parameters of the automated luminaires such as light intensity, size, color, and so on. In this way, an operator of follow spot controller 200 may concentrate solely on directing the pan and tilt parameters of one or more of the automated luminaires 120 and 122 and not be concerned about other parameters. In other embodiments, the override may include other light characteristics, such as an iris or focusing of the light beam and/or its intensity. In such embodiments, the overridden characteristics may be selectable by an operator of the follow spot controller 200 or an operator of the control desk 126. In such embodiments, the overridden characteristics may be selected based upon cue data stored in the follow spot controller 200 or in the control desk 126.

Follow spot controller 200 may control a single automated luminaire or may simultaneously control multiple automated luminaires. In the case where multiple automated luminaires 122 and/or 120 are being controlled, follow spot controller 200 may substantially continuously compensate for the different locations of each of the luminaires relative to the performance area 240 and adjust the pan and tilt parameters sent to each luminaire such that each luminaire is directed to the same spot on the performance area 240 based on the pan and tilt parameters of the manually controlled follow spot. Such substantially continuous compensation is described in more detail with reference to FIGS. 6 and 9.

Follow spot controller 200 may incorporate a display screen that displays a live video signal received via communication link 234 from a camera 124 mounted on an automated luminaire 122 (or several cameras on several luminaires (not shown)). The communication link 234 may be a wired, wireless, or optical communication link. Such a live video display may allow the operator controlling follow spot controller 200 to see the performance area 240 and the lighting and more accurately control the pan and tilt position of the automated luminaires 122 and/or 120. Such a system allows the follow spot controller 200 to be situated in a convenient and safe location for the operator. Follow spot controller 200 may be mounted on a tripod or stand 238 to locate the follow spot controller 200 at a comfortable height for the operator.

In some embodiments, the communication link 234 is an analog video signal. In other embodiments, the communication link 234 is a digital communication link that carries a digital video signal. In still other embodiments, the communication link 234 may be bidirectional, allowing an operator of the follow spot controller 200 to control set up and other parameters of the camera 124.

In further embodiments, multiple follow spot controllers 200 may be used in a single production. Each follow spot controller 200 would have its own attendant operator and would control one or more automated luminaires 122.

Figure 3:
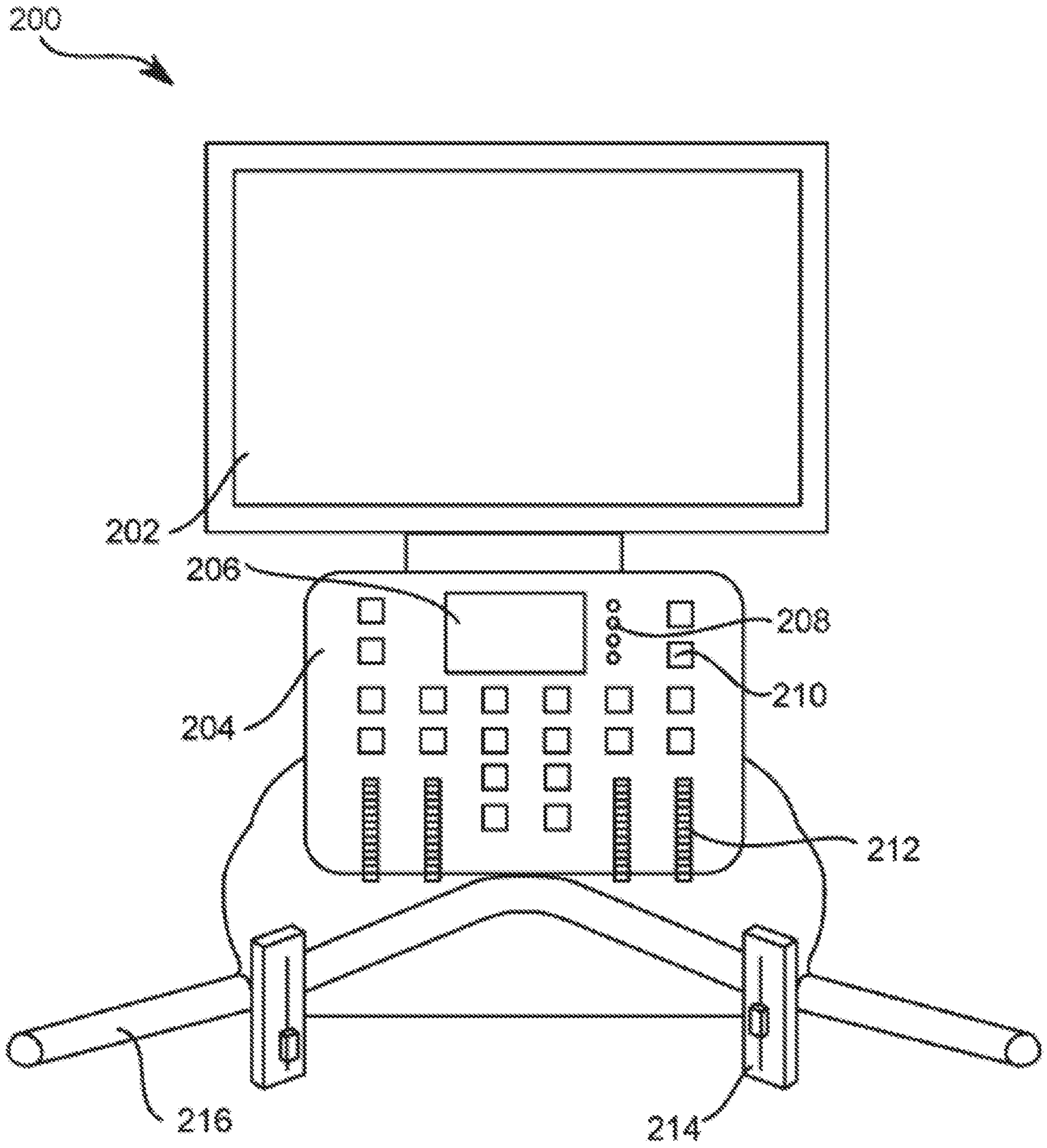
FIG. 3 illustrates an embodiment of the follow spot controller illustrated in FIG. 2.

FIG. 3 presents a schematic view of the follow spot controller 200 of FIG. 2. The follow spot controller 200 includes an operating handle 216, which an operator uses to move the follow spot controller 200 to control the movement of an automated luminaire 120. The handle 216 is fitted with encoders (not shown) to provide the follow spot controller 200 with information relating to a direction the operator has moved the handle 216 in at least pan and tilt axes of movement. In a simple system, the follow spot controller 200 may include only the handle 216.

In some embodiments, the follow spot controller 200 includes additional user-operated controls such as faders or knobs 214 mounted on the handle 216, the position or other state of which controls a parameter of the automated luminaire 120 and/or 122. In other embodiments, grips of the handle 216 are user-operated controls that rotate relative to the handle 216, their rotational state providing control of other parameters, such as focus, intensity, or beam angle. Such additional controls may be assignable to any desired function (or parameter) of the automated luminaire 120. For example, one fader may control a brightness of the luminaire, while another controls a beam size. Additionally, yet further user-operated controls 212 may be provided on the console 204 and their rotational state used to control still other parameters.

In some embodiments, the console 204 provides the ability to store and recall cues containing information such as pan and tilt, color, size, or any other parameters of the luminaires under its control. The console 204 may also contain a display 206 that provides information and feedback relating to the control and working of the system, as well as function buttons 210 and indicators 208.

Follow spot controller 200 may also include a display screen 202 showing a live video signal from a camera, as described earlier. In some embodiments, the operator may select between different video feeds using the control functionality of console 204.

In some embodiments, the follow spot controller 200 is fixed in position, while in other embodiments it is gimballed so that it can be panned and tilted to point at different locations on the performance area 240 or around the house (performance facility). In installations where the controller is located to provide the operator a direct view of the performance area 240, the operator can point the follow spots by dead reckoning while directly observing the performance area 240 by eye. In installations where the operator cannot directly view the performance area 240, the operator may rely on the display screen 202 and a camera mounted on the follow spot controller 200, where the camera is positioned to allow a view of the performance area 240. In still other embodiments, the operator may rely on the display screen 202 and the camera 124 mounted on the automated luminaire 122.

In some embodiments, the controller does not physically move. Instead, the operator controls the follow spots' motion via a joystick or other interface device. In such embodiments, the follow spot controller 200 and the display screen 202 are stationary, but the displayed view changes with the direction of the follow spots based on the user's manipulation of the joystick.

In other embodiments the control is combined. The follow spots' motion matches the pointing of the follow spot controller 200 when the performer or target point 242 is viewable from the location of the controller or by the camera relied on by the controller. When the target point 242 is outside that range, the display screen 202 presents a three-dimensional (3-D) rendered view (or virtual view), allowing the follow spots to follow a performer or target point 242 that is not in view of the operator or the camera.

In some embodiments, the follow spot controller 200 automatically or manually switches control of the luminaires 120 and/or 122 back to the main control desk 126 and then, at a later time, allows the operator of the follow spot controller 200 to take back control of the luminaires 120 and 122.

Figure 4:
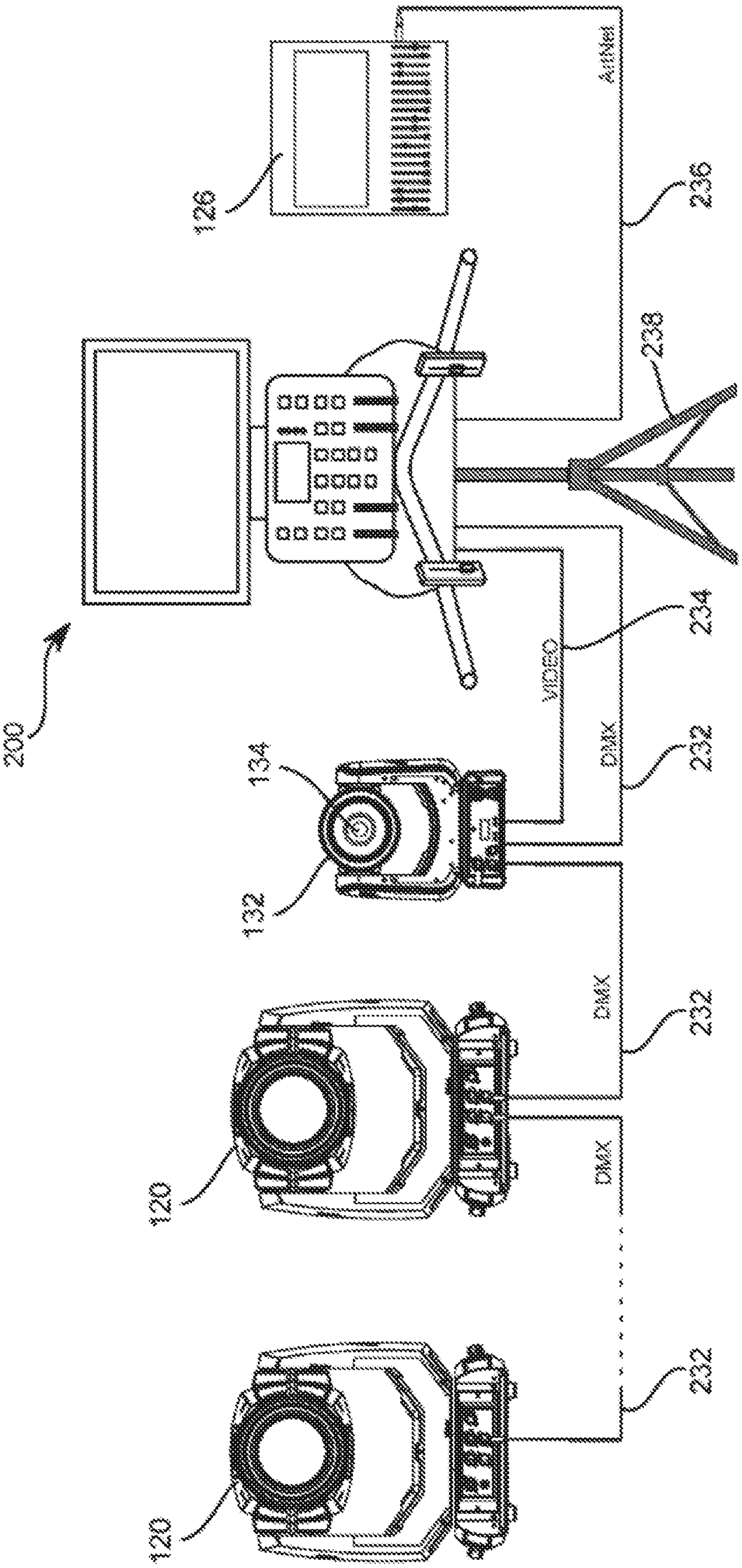
FIG. 4 illustrates the main components of a further embodiment of a remotely controlled follow spot system.

FIG. 4 illustrates a second embodiment of a remotely controlled follow spot system according to the disclosure. In this embodiment, a camera 134 is provided that is separately mounted from any automated luminaire controlled by the follow spot controller 200. The camera 134 is mounted on a PTZ (Pan-Tilt-Zoom) system 132 such that the operator may control an orientation of the camera 134, thereby controlling a view obtained by the camera 134. In various embodiments, such control of the orientation of the camera 134 is provided by the follow spot controller 200 or by a separate camera controller. When provided by the follow spot controller 200, such control of the camera 134 may be provided in a separate mode of operation of the follow spot controller 200 from a mode where the follow spot controller 200 controls the luminaire 122.

In other embodiments, such a separately mounted camera may be mounted in a fixed orientation, providing a static view of the performance area 240.

Figure 5:
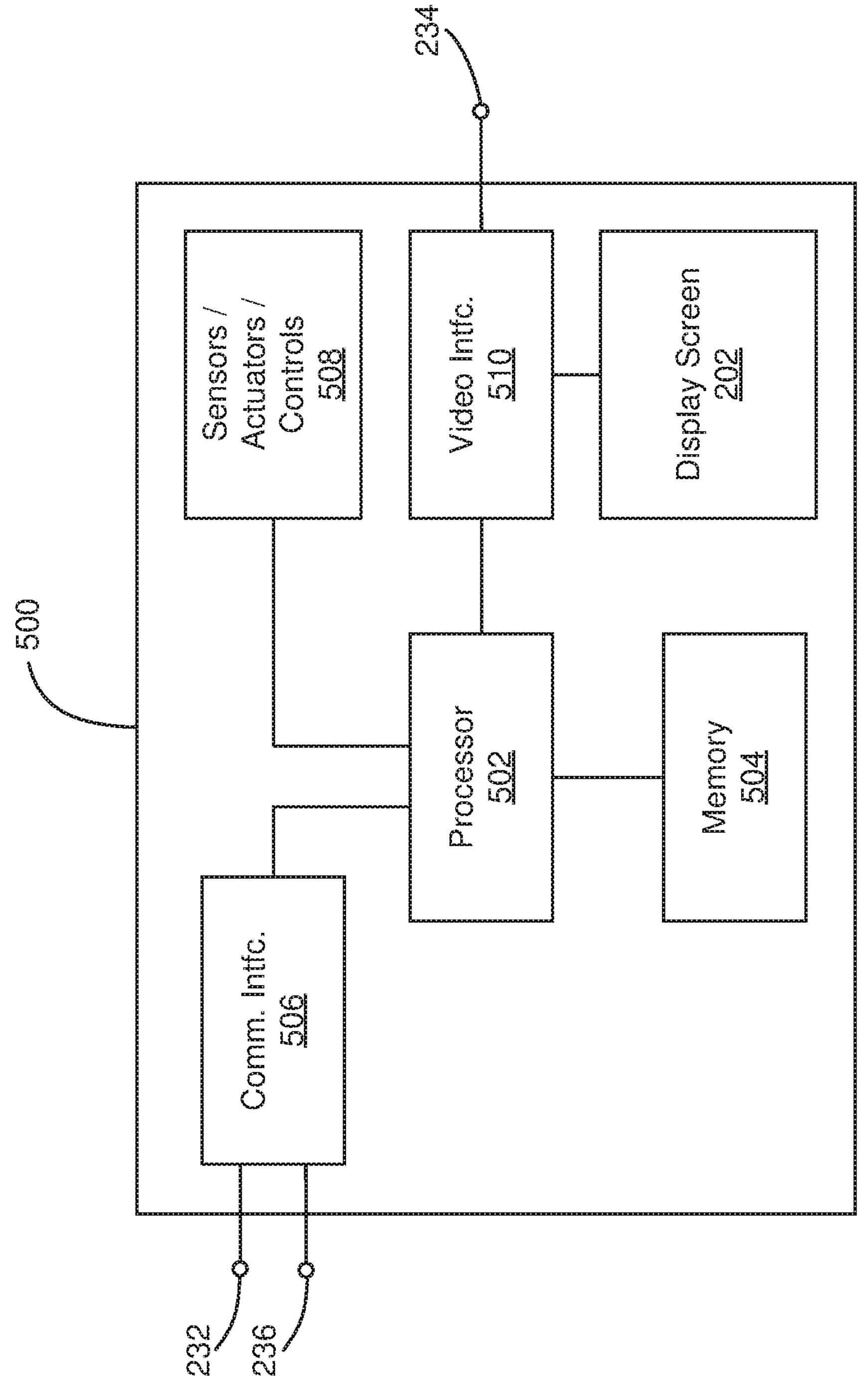
FIG. 5 presents a block diagram of a control system for a follow spot controller according to the disclosure.

FIG. 5 presents a block diagram of a control system (or controller) 500 for a follow spot controller according to the disclosure. The control system 500 is suitable for use in follow spot controllers 200, 300, or 400, as described with reference to FIGS. 3, 7, and 8, respectively. The control system 500 includes a processor 502 electrically coupled to a memory 504. The processor 502 is implemented by hardware and software. The processor 502 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 502 is further electrically coupled to and in communication with a communication interface 506 and one or more sensors, actuators, and/or controls 508. The communication interface 506 is coupled to, and configured to communicate with, automated luminaires 120 and 122 via first lighting control communication link 232. The communication interface 506 also is coupled to, and configured to communicate with, lighting control desk 126 via second lighting control communication link 236.

The processor 502 is further electrically coupled to and in communication with a video interface 510, which is in turn electrically coupled to a video camera via communication link 234. The video interface 510 is further electrically coupled to the display screen 202.

The control system 500 is suitable for implementing processes, follow spot control, continuous compensation, and other functionality as disclosed herein, which may be implemented as instructions stored in the memory 504 and executed by the processor 502.

The memory 504 comprises one or more disks, tape drives, and/or solid-state drives and may be used as an over-flow data storage device, to store programs when such programs are selected for execution, and to store instructions and data that are read during program execution. The memory 504 may be volatile and/or non-volatile and may be read-only memory (ROM), random access memory (RAM), ternary content-addressable memory (TCAM), and/or static random-access memory (SRAM).

Figure 6:
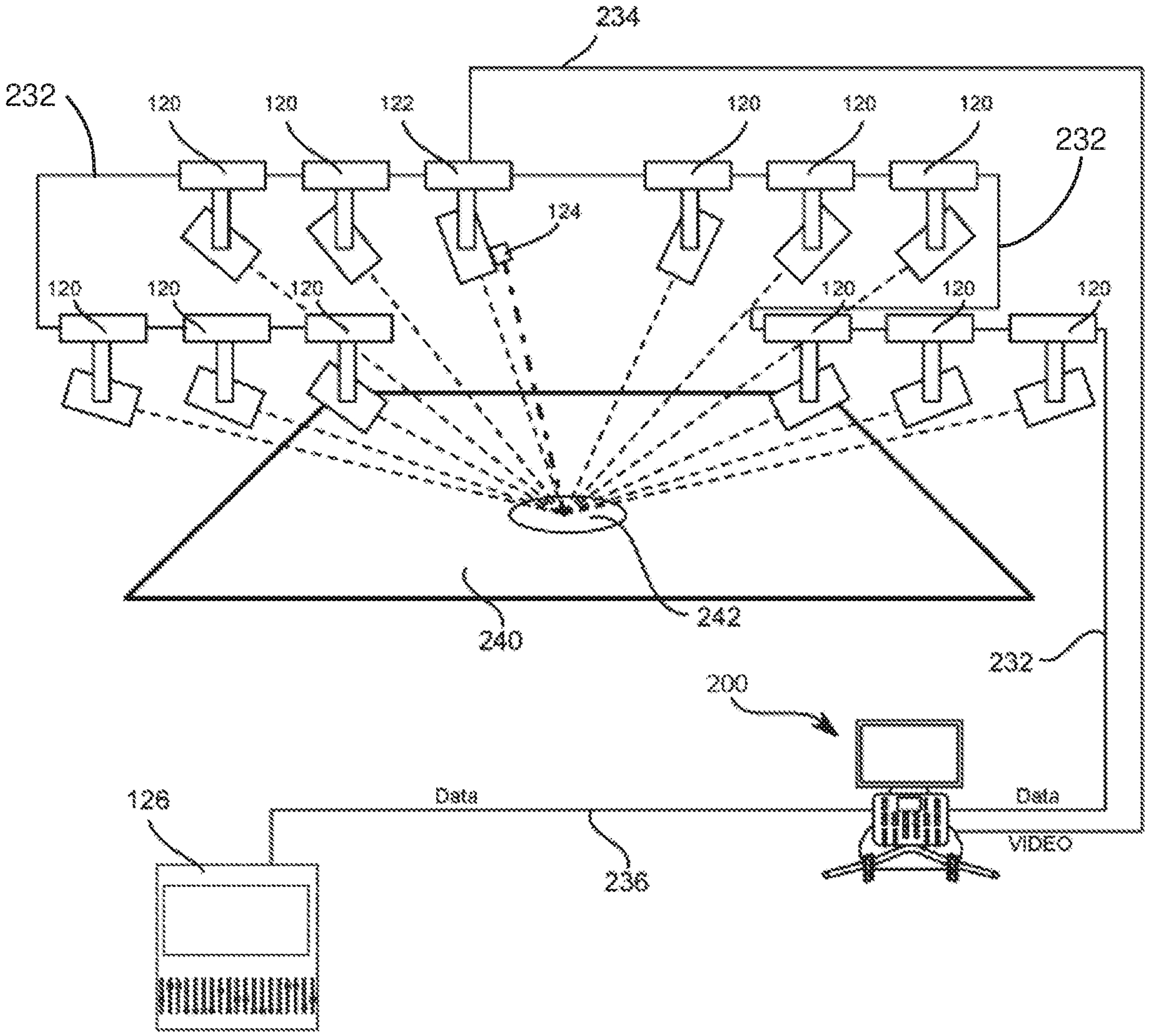
FIG. 6 illustrates a schematic of an embodiment of a complete remotely controlled follow spot system as it might be installed for a production.

FIG. 6 illustrates a schematic of a first embodiment of a remotely controlled follow spot system according to the disclosure, as it might be installed for a production. Automated luminaires 120 are rigged (or mounted) above and/or around a performance area 240. At least one luminaire 122 is fitted with a video camera 124. In other embodiments, a camera may be mounted in a PTZ system, as described with reference to FIG. 4. Control data for the luminaires 120 and 122 is routed from a lighting control desk 126 through a second lighting control communication link 236 to a follow spot controller 200 and then via a first lighting control communication link 232 to luminaires 120 and 122. A video signal is routed back from camera 124 via communication link 234 to a display screen 202 on the follow spot controller 200. The image from the camera 124 may be displayed directly on the display screen 202 or may be processed in the follow spot controller 200 before being displayed.

As described previously, an operator of the follow spot controller 200 may take over control of some, or all, of the control parameters of one or more of the luminaires 120 and 122. In particular, the follow spot controller 200 may control the pan and tilt parameters of one or more of luminaires 120 and 122 and direct them to illuminate a target point 242 on performance area 240. In other embodiments, controls of the follow spot controller 200 may control other parameters of one or more of the luminaires 120 and 122, e.g. brightness, focus, beam size, and/or color. Target point 242 may indicate a performer, and the operator may then move the handles on follow spot controller 200 such that the connected luminaire or luminaires continues to illuminate the performer as he/she moves around the performance area 240.

The performance area 240 may include a stage or dais, a surrounding area, and/or some or all of the facility in which a performance takes place.

Figure 7:
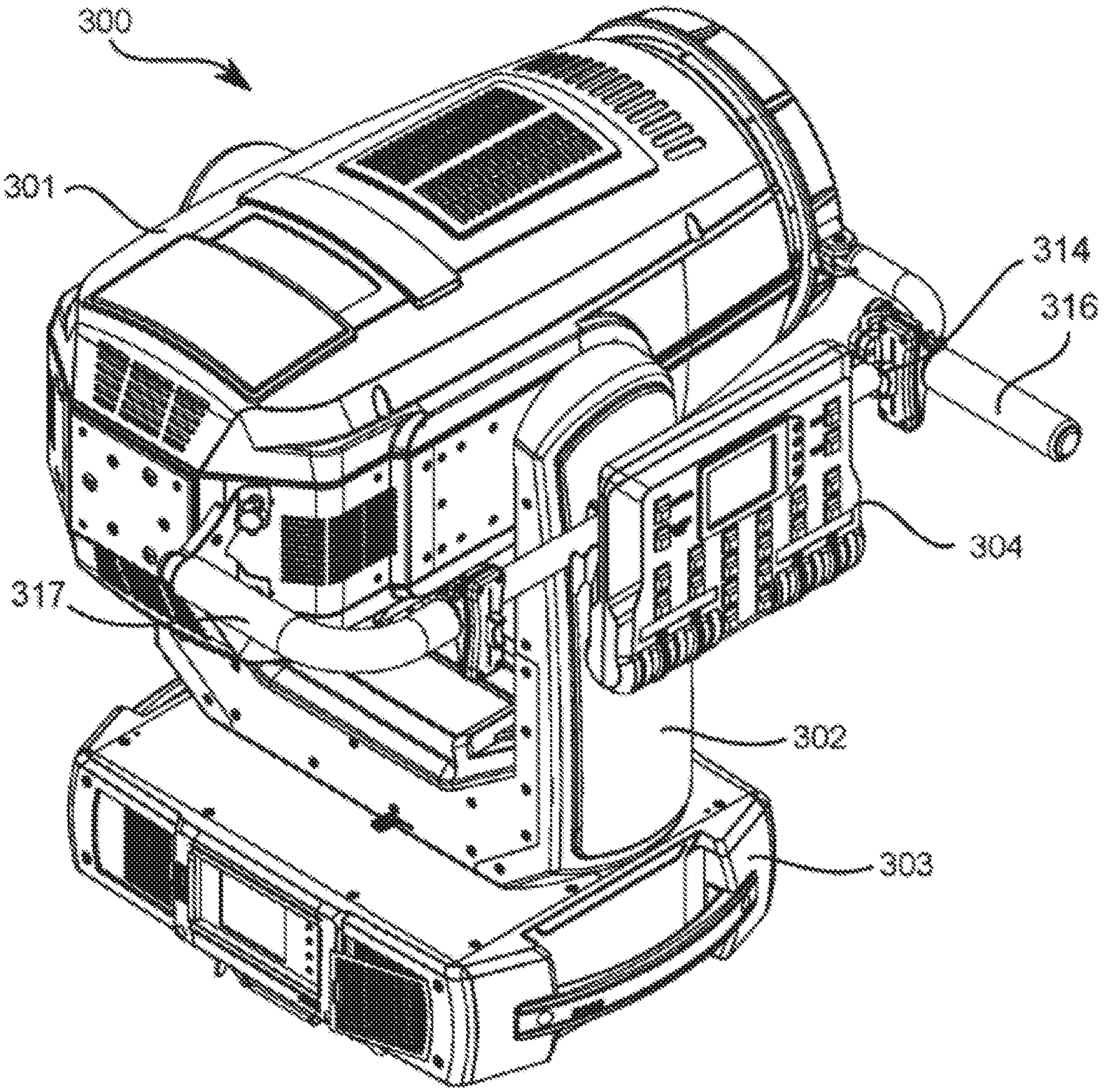
FIG. 7 illustrates an embodiment of an automated luminaire modified to be used as a follow spot or a follow spot controller.

In some embodiments, a modified automated luminaire may be used as a follow spot controller according to the disclosure. FIG. 7 illustrates a first embodiment of an automated luminaire 300 according to the disclosure, which has been modified to be used as a follow spot or as a follow spot controller. The automated luminaire 300 is a hybrid automated/manually controlled fixture. The automated luminaire 300 is modified to be used as a follow spot or a follow spot controller by a hands-on human user as he would a traditional manual follow spot. A conventional automated luminaire may be modified by adding handles 316 and 317. By overriding or disabling the internal motor drives that control "pan" motion of yoke 302, relative to base 303, and "tilt" movement of head 301, relative to yoke 302, an operator can control the pan and tilt position of automated luminaire 300 using handles 316 and 317. In some embodiments, controls 314 and console 304 provide control over further parameters of the luminaire. Such an automated luminaire may be manually controlled by the operator in the manner of a prior art follow spot.

Additionally, the automated luminaire 300 functions as a follow spot controller 200 as described with reference to FIG. 2. In such an embodiment, sensors in the pan and tilt mechanisms of automated luminaire 300 sense the operator's movement of the automated luminaire 300. In embodiments that include controls 314 and console 304, the automated luminaire 300 both tracks its movement by monitoring its pan and tilt position, as well as monitoring the operator's manipulations of other light modulating controls.

Figure 8:
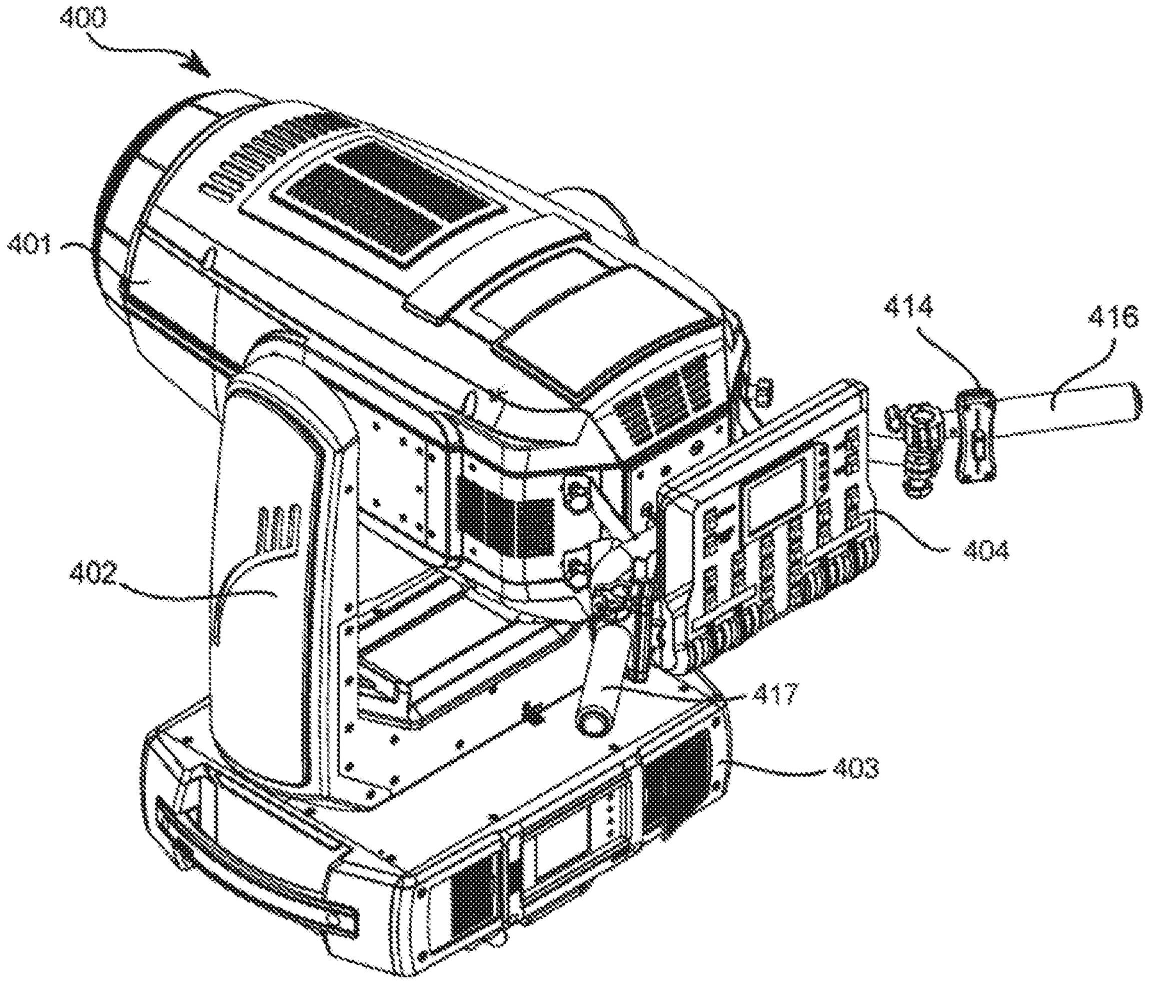
FIG. 8 illustrates a further embodiment of an automated luminaire modified to be used as a follow spot or a follow spot controller.

FIG. 8 illustrates a second embodiment of an automated luminaire 400 that has been modified to be used as a follow spot or as a follow spot controller. A conventional luminaire 400 is modified by adding handles 416 and 417 and overriding the internal motor drives that control pan motion of yoke 402 relative to base 403 and tilt movement of head 401 relative to yoke 402. An operator can direct automated luminaire 400 by grasping the handles 416 and 417 and moving the head 401. In some embodiments, controls 414 and console 404 provide control over further parameters of the luminaire. The operator can thus control the automated luminaire 400 in the same manner as a conventional follow spot. In some embodiments, the automated luminaire 400 may function as a follow spot controller 200 as described with reference to FIG. 2. In such embodiments, sensors in the pan and tilt mechanisms of the automated luminaire 400 sense the operator's movement of the luminaire.

Figure 9:
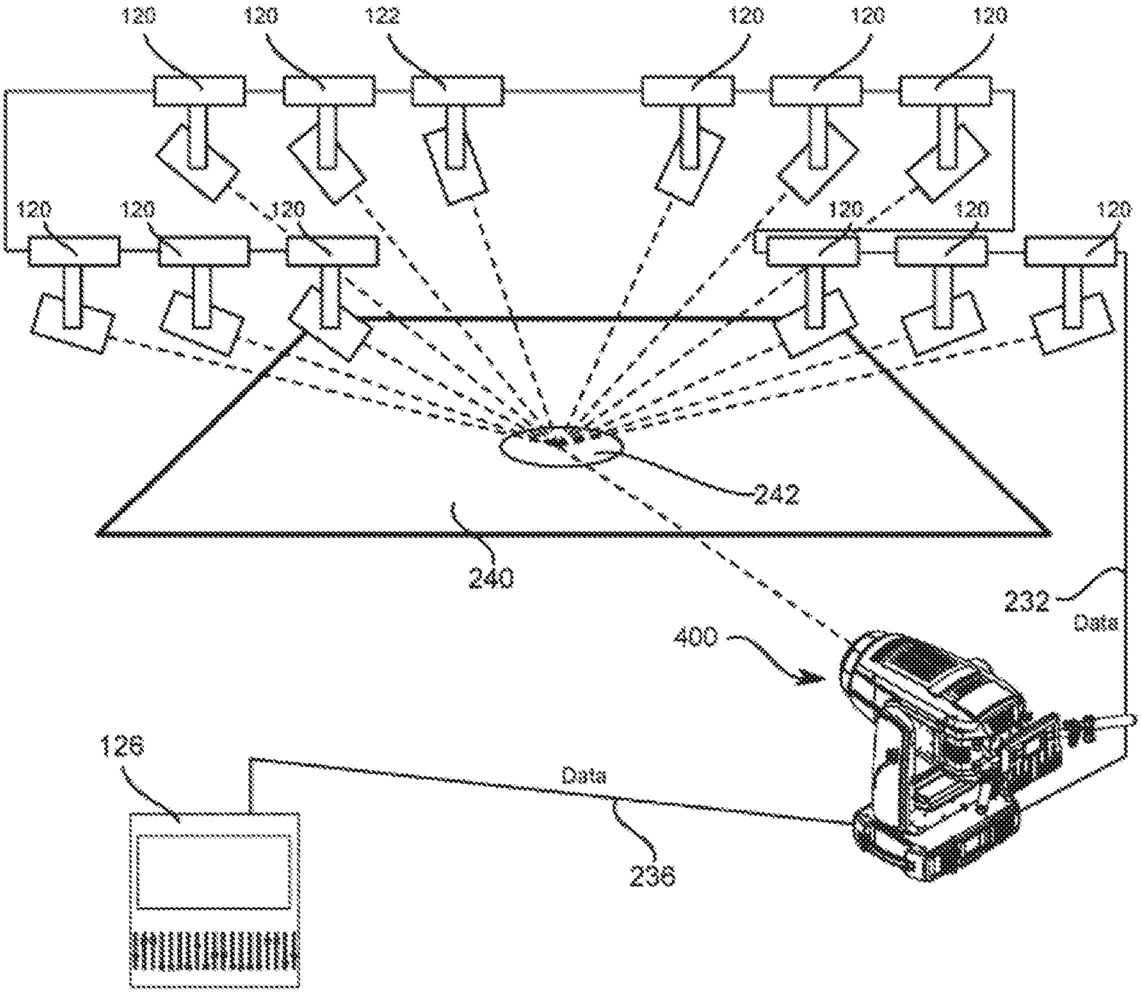
FIG. 9 illustrates a schematic of a further embodiment of a complete remotely controlled follow spot system as it might be installed for a production.

FIG. 9 illustrates a schematic of a second embodiment of a remotely controlled follow spot system according to the disclosure, as it might be installed for a production. Multiple automated luminaires 120 are rigged to illuminate a performance area 240. The control data for the luminaires 120 is routed from a lighting control desk 126 through network 236 to a combined luminaire and follow spot controller 400 and then via network 232 to luminaires 120. In other embodiments, the automated luminaire 300, described with reference to FIG. 7, may be used in the system shown in FIG. 9.

As described previously, an operator of the combined luminaire and follow spot controller 400 may take over control of some or all of the control parameters of one or more of the luminaires 120. In such a circumstance, the automated luminaire becomes a follow spot controller. In particular, combined luminaire and follow spot controller 400 may control the pan and tilt positions of one or more of luminaires 120 such that they are collectively and individually directed to illuminate a target point, 242, on performance area 240. Thus the control of automated follow spots can be controlled by the manual control of a single follow spot. Target point 242 may indicate a performer, and the operator may then move the handles on combined luminaire and follow spot controller 400 to illuminate the performer with luminaires 120 as she moves around the performance area 240.

As described briefly with reference to FIG. 2, in some embodiments, a processor, controller, or other control system in a follow spot controller according to the disclosure provides continuous compensation of pan and tilt positions of one or more automated luminaires 120, based on an operator's manipulation of the follow spot controller 200 to control the automated luminaire 122. The control system creates a 3-D model of the performance area 240 (represented by one or more surfaces), and locations and mounting orientations of the automated luminaires 120 and 122 relative to the performance area 240. The 3-D model may also include locations and mounting orientations relative to the performance area 240 of the camera 124 and (where used) the camera 134.

Such a 3-D model may be determined from manual measurements of the surface and locations and mounting orientations. In other embodiments, the extent and locations and mounting orientations may be determined using sensors placed in or on the performance area 240, the automated luminaires 120 and 122, and/or the camera 124. In still other embodiments, the extent and locations of mounting orientations may be determined by the operator moving the center of the light beam projected by the luminaire 122 to each of a plurality of predetermined calibration points in the performance area 240, and indicating to the system the illuminated calibration point.

As the operator moves the luminaire 122 associated with the camera 124, the control system calculates a 3-D vector representing the center of a light beam projected by the luminaire 122. Based on the calculated 3-D vector and, in some embodiments, the location and mounting orientation relative to the performance area 240 of the camera 124, the control system calculates a location of the target point 242 on the performance area 240.

Based on the calculated location of the target point 242 and the locations and mounting orientations relative to the performance area 240 of the automated luminaires 120, the control system calculates individual pan and tilt parameters for each automated luminaire 120 that will result in light beams that also intersect the performance area 240 at the target point 242. These calculations are performed substantially continuously in real time to provide continuous compensation of orientations of the automated luminaires 120, based on the operator's manipulation of the follow spot controller 200.

For the purposes of this disclosure, substantially continuously means sufficiently frequently to prevent perceivably jerky movement of the automated luminaires 120 and/or 122. In some embodiments, such calculated pan and tilt parameters are sent to each automated luminaire 120 at least once every 100 milliseconds. In a preferred embodiment, such calculated pan and tilt parameters are sent to each automated luminaire 120 at least once every 23 milliseconds.

In embodiments where independent camera 134 is used, pan and tilt parameters may also be calculated for the camera 134 that will result in the camera 134 automatically tracking to provide a view of the performance area 240 at the target point 242. Such camera pan and tilt parameters may be recalculated substantially continuously as described above, or with a period comparable to the recalculation of pan and tilt parameters for the automated luminaires 120.

Based on the calculated location of the target point 242 and the location and mounting orientation of the camera relative to the performance area 240 of the automated luminaires 120, the follow spot controller 200 calculates individual pan and tilt parameters for each automated luminaire 120 that will result in light beams that also intersect the performance area 240 at the target point 242.

In some embodiments the follow spot controller 200 (or modified automated luminaire 400) may also control one or more of beam zoom, iris, and light intensity for each controlled automated luminaire 120 or 122. Such control of beam zoom and/or iris would enable the follow spot controller 200 to maintain a constant beam size from each controlled luminaire on a performer as the performer moves within the performance area 240. Further, such control of intensity would enable the follow spot controller 200 to maintain a consistent light intensity on performers as they move within the performance area 240. In applications where the performance is being captured by a video or film camera it is of benefit to maintain a consistent light level on the performer, so that the camera does not have to be adjusted as the performer moves.

In such embodiments, the performer's position establishes a target point 242 in the 3-D model, as calculated from an operator's use of the follow spot controller 200 to point a controlled luminaire at the performer. The follow spot controller 200 may use an initial beam zoom, iris, and/or light intensity for each controlled luminaire, along with a varying throw distance from each controlled luminaire to the calculated moving target point in the 3-D model, to determine changes to make to the beam zoom, iris, and/or light intensity for each controlled luminaire. In such embodiments, an operator of the lighting control desk 126 (or the follow spot controller 200 or modified automated luminaire 400) may choose to allow any one, or any combination, of beam zoom, iris, and light intensity of controlled luminaires to be automatically adjusted by the follow spot controller 200 in order to maintain one or both of beam size and target light intensity, in addition to pan and tilt, for controlled luminaires.

In some embodiments, such a 3-D model is used to provide an operator with a virtual view of the performance area, for example where neither the operator nor any camera has a view of the performance area 240. In various embodiments, such continuous compensation may be provided by a control system in any of follow spot controller 200, modified automated luminaire 300, or modified automated luminaire 400. In other embodiments such continuous compensation is provided by a control system of the lighting control desk 126. In various embodiments, such continuous compensation is enabled and disabled from one of the follow spot controller 200 or lighting control desk 126, and may be enabled for selected ones of the automated luminaires 120.

While the disclosure has been described with respect to a limited number of embodiments, those skilled in the art, having benefit of this disclosure, will appreciate that other embodiments may be devised which do not depart from the scope of the disclosure herein. The disclosure has been described in detail, it should be understood that various changes, substitutions and alterations can be made hereto without departing from the spirit and scope of the disclosure.

What is claimed is:

1. A follow spot controller, comprising:

a memory;

a processor electrically coupled to the memory, configured to execute instructions received from the memory;

a mounting mechanism configured to mount a follow spot controller for motion in at least pan and tilt axes of movement; and a communication interface electrically coupled to the processor, the communication interface comprising:

a first communication link configured to communicate with a lighting control desk; and a second communication link configured to communicate unidirectionally with an automated luminaire, wherein the processor is further configured to:

receive control parameters sent to the automated luminaire from the lighting control desk, sense a physical orientation of the mounting mechanism in the at least pan and tilt axes of movement, create modified control parameters by replacing received pan and tilt parameters in the received control parameters with replacement pan and tilt parameters based on the sensed physical orientation of the mounting mechanism in the at least pan and tilt axes of movement, and send the modified control parameters to the automated luminaire, the received pan and tilt parameters and the replacement pan and tilt parameters indicating physical orientations of the automated luminaire.

2. The follow spot controller of claim 1, further comprising a user-operated control, wherein the processor is further configured to replace other control information in the received control parameters with information based on a state of the user-operated control, and send the modified control parameters to the automated luminaire.

3. The follow spot controller of claim 1, further comprising:

a video interface configured to receive a video signal; and a display screen coupled to the video interface and configured to display the video signal.

4. The follow spot controller of claim 3, wherein the video signal is received from a camera mechanically coupled to the automated luminaire.

5. The follow spot controller of claim 3, wherein the video signal is received from a camera mounted separately from the automated luminaire, and wherein the processor is further configured to control an orientation of the camera.

6. The follow spot controller of claim 1, wherein the mounting mechanism comprises a modified automated luminaire that includes pan and tilt mechanisms having disabled pan and tilt motor drives, respectively, wherein the processor is configured to sense the physical orientation of the mounting mechanism by sensing a physical orientation of the pan and tilt mechanisms of the modified automated luminaire.

7. A follow spot control system, comprising:

a memory;

a processor electrically coupled to the memory and configured to execute instructions received from the memory; and a mounting mechanism configured to mount a follow spot controller for motion in at least pan and tilt axes of movement, wherein the processor is further configured to:

sense a physical orientation of the mounting mechanism in at least pan and tilt axes of movement, send operator pan and tilt parameters to a first automated luminaire of a plurality of automated luminaires based on the sensed physical orientation of the mounting mechanism, and send individual calculated pan and tilt parameters to each of a remainder of the plurality of automated luminaires based on (i) the pan and tilt parameters of the first automated luminaire and (ii) a three-dimensional model of a surface of a performance area and individual locations and mounting orientations of each of the plurality of automated luminaires relative to the performance area, the operator pan and tilt parameters indicating a physical orientation of the first automated luminaire and the individual calculated pan and tilt parameters indicating physical orientations of the associated ones of the remainder of the plurality of automated luminaires.

8. The follow spot control system of claim 7, wherein the processor is configured to:

calculate a target point on the surface of the performance area based on the operator pan and tilt control parameters, and calculate the calculated pan and tilt parameters based on the target point.

9. The follow spot control system of claim 7, wherein the operator pan and tilt parameters and calculated pan and tilt parameters are sent substantially continuously to associated ones of the plurality of automated luminaires.

10. The follow spot control system of claim 7, further comprising:

a video interface configured to receive a video signal; and a display screen coupled to the video interface and configured to display the video signal.

11. The follow spot control system of claim 10, wherein the video signal is received from a camera mechanically coupled to the first automated luminaire.

12. The follow spot control system of claim 10, wherein the video signal is received from a camera mounted in a fixed position.

13. The follow spot control system of claim 10, wherein the mounting mechanism comprises a modified automated luminaire that includes pan and tilt mechanisms having disabled pan and tilt motor drives, respectively, wherein the processor is configured to sense the physical orientation of the mounting mechanism by sensing a physical orientation of the pan and tilt mechanisms of the modified automated luminaire.

14. The follow spot control system of claim 7, wherein the processor is further configured to:

receive control parameters sent to the plurality of automated luminaires from a lighting control desk;

replace received pan and tilt parameters in the received control parameters for the first one of the plurality of automated luminaires with the operator pan and tilt parameters;

replace received pan and tilt parameters in the received control parameters for the remainder of the plurality of automated luminaires with the corresponding individual calculated pan and tilt parameters; and send the received control parameters with the replaced pan and tilt parameters to the plurality of automated luminaires, the received pan and tilt parameters indicating physical orientations of the first automated luminaire and the remainder of the plurality of automated luminaires.

15. The follow spot control system of claim 14, further comprising a user-operated control, wherein the processor is further configured to replace other control information in the received control parameters with information based on a state of the user-operated control, and send the received control parameters with the replaced other control parameters to one or more of the plurality of automated luminaires.

16. The follow spot control system of claim 14, wherein the processor is further configured to:

replace one or more additional control parameters in the received control parameters, where the replaced additional control parameters include one or more of zoom, intensity, and iris control parameters, the replaced additional control parameters configured to maintain one or both of constant intensity and constant spot size at a target point on the surface of the performance area; and send the received control parameters with the replaced additional control parameters to one or more of the plurality of automated luminaires.

* * * * *